United States Patent
Bennett et al.

(10) Patent No.: US 10,059,251 B2
(45) Date of Patent: Aug. 28, 2018

(54) FORCE-DIVERTING TAIL LIGHT GUARD

(71) Applicant: Omix-Ada, Inc., Suwanee, GA (US)

(72) Inventors: Patrick W. Bennett, Gainesville, GA (US); Taylor E. Johns, Atlanta, GA (US); Christopher D. Van Buren, Charlotte, NC (US)

(73) Assignee: Omix-ADA, Inc., Suwanee, GA (US)

( * ) Notice: Subject to any disclaimer, the term of this patent is extended or adjusted under 35 U.S.C. 154(b) by 34 days.

(21) Appl. No.: 15/408,162

(22) Filed: Jan. 17, 2017

(65) Prior Publication Data
US 2018/0201179 A1    Jul. 19, 2018

(51) Int. Cl.
*B60J 7/00* (2006.01)
*B60Q 1/00* (2006.01)
(Continued)

(52) U.S. Cl.
CPC ......... *B60Q 1/0005* (2013.01); *B60Q 1/2615* (2013.01); *B60Q 1/30* (2013.01);
(Continued)

(58) Field of Classification Search
CPC ....... H01L 2924/00; H01L 2224/48247; H01L 2224/45147; H01L 2224/48465; H01L 2224/73265; H01L 2224/48091; B60Q 1/30; B82Y 20/00; F21L 4/005; F21S 43/14
(Continued)

(56) References Cited

U.S. PATENT DOCUMENTS

D75,985 S * 8/1928 Rockhill ............... D26/119
D178,895 S * 10/1956 McKnight ............. 293/115
(Continued)

FOREIGN PATENT DOCUMENTS

CN  205227216 U  5/2016
CN  205239299 U  5/2016

OTHER PUBLICATIONS

Images 1-4.
(Continued)

*Primary Examiner* — Kiran B Patel
(74) *Attorney, Agent, or Firm* — Womble Bond Dickinson (US) LLP

(57) ABSTRACT

A force-diverting tail light guard is disclosed for a vehicle having tail lights that project from the body of the vehicle with each tail light having a vehicle facing surface and a rear-facing surface joined by sides. The tail light guard has a base configured to be mounted against the body of the vehicle surrounding the tail light. The base may include a plate that at least partially covers the vehicle-facing surface of the tail light. A cage is configured to be mated to the base and at least partially covers at least the rear-facing surface of the tail light. The base and cage, when mated together around the tail light, at least partially surround the tail light. Attachment structures are disclosed for mounting the tail light guard to the body of the vehicle surrounding the tail light. The tail light guard is configured to divert external forces due to impact around the tail light and directly to the body of the vehicle to prevent impacts from breaking the tail light or rendering the tail light inoperable.

10 Claims, 4 Drawing Sheets

(51) Int. Cl.
*B60Q 1/30* (2006.01)
*B60Q 1/26* (2006.01)
*F21S 8/10* (2006.01)
*F21S 43/50* (2018.01)
*F21S 45/10* (2018.01)

(52) U.S. Cl.
CPC .............. *F21S 43/51* (2018.01); *F21S 45/10* (2018.01); *F21S 48/255* (2013.01); *F21S 48/31* (2013.01)

(58) Field of Classification Search
USPC ..................................................... 296/187.11
See application file for complete search history.

(56) References Cited

U.S. PATENT DOCUMENTS

| | | | | |
|---|---|---|---|---|
| 3,514,589 | A * | 5/1970 | Huber | F21S 43/255 362/293 |
| 3,818,211 | A * | 6/1974 | Wilfert | B60Q 1/30 280/847 |
| 4,153,928 | A * | 5/1979 | Speedy | F21S 48/2218 362/300 |
| D282,687 | S * | 2/1986 | McMahon | B60Q 1/0005 D26/119 |
| D288,008 | S * | 1/1987 | McMahon | D26/121 |
| D288,137 | S * | 2/1987 | Hirano | D26/120 |
| D289,087 | S * | 3/1987 | Kobata | D26/120 |
| 4,807,094 | A * | 2/1989 | Mateos | F21S 41/55 362/510 |
| 4,994,942 | A * | 2/1991 | Georgeff | B60Q 1/2607 362/368 |
| D316,461 | S * | 4/1991 | McGlothlin | D26/139 |
| D318,537 | S * | 7/1991 | Allman | D26/139 |
| 5,205,633 | A * | 4/1993 | Kasboske | B60Q 1/0483 362/368 |
| D355,039 | S * | 1/1995 | Winick | D26/139 |
| D364,704 | S * | 11/1995 | Alger | B60R 19/00 D12/167 |
| 5,482,336 | A * | 1/1996 | Rouse | B60R 19/52 180/68.5 |
| D387,469 | S * | 12/1997 | Saleen | D26/139 |
| D387,471 | S * | 12/1997 | Alger | D26/139 |
| D390,821 | S * | 2/1998 | Thorne | B60R 19/52 D12/190 |
| 5,876,003 | A * | 3/1999 | Waagenaar | B60R 19/00 248/200 |
| D412,214 | S * | 7/1999 | Hejtmanek | B60Q 1/0483 D26/28 |
| D427,363 | S * | 6/2000 | Sacco | B60Q 1/2607 D26/120 |
| D432,064 | S * | 10/2000 | Hartog | D12/190 |
| D472,004 | S * | 3/2003 | Pfeiffer | D26/28 |
| D485,935 | S * | 1/2004 | Tsai | F21S 48/2218 D26/139 |
| D485,936 | S * | 1/2004 | Tsai | B60Q 1/0058 D26/139 |
| D487,531 | S * | 3/2004 | Tsai | D26/139 |
| D488,254 | S * | 4/2004 | Tsai | B60Q 1/2607 D26/139 |
| D488,255 | S * | 4/2004 | Tsai | D26/139 |
| D488,584 | S * | 4/2004 | Tsai | D26/139 |
| D540,977 | S * | 4/2007 | Hunkins | D26/119 |
| D544,641 | S * | 6/2007 | Elwell | D26/139 |
| D544,642 | S * | 6/2007 | Elwell | D26/139 |
| 7,261,346 | B1 * | 8/2007 | Kubesh | B60R 19/52 180/68.6 |
| 7,314,245 | B1 * | 1/2008 | Shymkiw | B60Q 1/0005 293/142 |
| D578,684 | S * | 10/2008 | Marquardt | D26/28 |
| D586,273 | S * | 2/2009 | Hamburger | D12/181 |
| D589,836 | S * | 4/2009 | Pokorny | D10/110 |
| D591,188 | S * | 4/2009 | Pokorny | D10/110 |
| D595,172 | S * | 6/2009 | Pokorny | D10/114.1 |
| 7,695,033 | B2 * | 4/2010 | Mae | B60R 19/03 293/102 |
| D632,424 | S * | 2/2011 | Fesler | D26/139 |
| D677,424 | S * | 3/2013 | Parkes | D26/139 |
| D677,425 | S * | 3/2013 | Parkes | F21S 41/55 D26/139 |
| D701,993 | S * | 4/2014 | Wu | D26/139 |
| D721,454 | S * | 1/2015 | King | D26/139 |
| D721,847 | S * | 1/2015 | Wu | B60Q 1/30 D26/139 |
| D721,848 | S * | 1/2015 | Wu | F21S 43/255 D26/139 |
| D729,973 | S * | 5/2015 | Gebhard | D26/119 |
| 9,310,044 | B2 * | 4/2016 | Pusch | B60Q 1/2607 |
| D802,810 | S * | 11/2017 | Johns | D26/28 |
| D805,245 | S * | 12/2017 | Johns | D26/139 |
| D815,994 | S * | 4/2018 | Nakamura | D12/163 |
| 2008/0225542 | A1 * | 9/2008 | Mertens | B60Q 1/0058 362/517 |

OTHER PUBLICATIONS

"How to Install a Tail Light Guard," http://www.jcwhitney.com/tail-light-guard, Nov. 22, 2016.
2007 & Up Jeep® Wrangler Catalog 2015: Accessories, Performance & Replacement Parts, ruggedridge.com.
"Rugged Ridge—Euro Tail light Guards," http://www.jcwhitney.com/rugged-ridge-euro-taillight-guards/p3068679.jcwx, Nov. 22, 2016.

* cited by examiner

FORCE-DIVERTING TAIL LIGHT GUARD

TECHNICAL FIELD

This disclosure relates generally to automotive accessories, accessories for ruggedizing vehicles for off-road use, and particularly to guards for protecting tail lights of off-road vehicles such as Jeep® brand vehicles.

BACKGROUND

Many owners and drivers of off-road vehicles such as Jeep® brand vehicles choose to enhance their stock vehicles with aftermarket accessories. Such accessories might include, for example, driving lights, snorkels, winches, wheels, suspensions, special ruggedized tires, and the like. While some off-road accessories are decorative, most serve the purpose of enhancing the resiliency and survivability of the vehicle when it is driven on very demanding and often punishing off-road terrain. One accessory often added to an off-road vehicle is protective guards that partially cover headlights, tail lights, and other lights with lenses subject to being broken by flying debris or impact. Tail lights can be particularly vulnerable since on most off-road vehicles, the tail lights mount on the surface of the vehicle and are completely exposed at the rear of the vehicle. A broken or non-functioning light can be unsafe, particularly in remote locations at night when it is important to see and be seen by other off-roaders nearby.

Numerous protective guards have been developed that at least partially cover the tail lights of off-road vehicles. Most such guards include some type of cage that covers the lenses of a tail light to deflect debris that might otherwise shatter the lenses. However, most such guards do little to prevent breakage of the tail light in the event of a serious impact to the tail light guard. This is at least in part because existing guards generally attach to the tail light structure itself either with screws or by simply being adhered to the lens with adhesive tape. Thus, in the event of a serious impact to the tail light guard, the force of the impact is transferred directly to the tail light inducing forces that often break the tail light or at least its lenses and/or render the tail light inoperable.

A need exists for a tail light guard for off-road vehicles that not only deflects flying debris but that also is configured such that the force of an impact to the guard is not transferred to tail light or its lenses, thereby avoiding breakage and assuring continued operation of the tail light when an impact occurs. It is to the provision of such a tail light guard that the present invention is primarily directed.

SUMMARY

Briefly described, a tail light guard for an off-road vehicle includes a base configured to be placed between the tail light structure and the body of the vehicle and a cage that mates in clamshell fashion to the base. The cage has bars that extend around the sides and back of the tail light thereby covering these portions of the tail light and the lenses incorporated into them. When mated together, the cage surrounds the tail light, and the base rests against the body of the vehicle. The base may also extend partially behind the tail light between the tail light and the vehicle body. With such a configuration, the vehicle facing surface of the tail light rests on the base and the base rests on the body of the vehicle. Preferably, both the base and the cage are made of a strong resilient material such as aluminum or steel.

The bars of the cage function to deflect flying debris that might break the tail light structure and they also bear the force of an impact. Furthermore, in the event of a serious impact to the cage, the force of the impact is transferred through the cage, around the tail light, to the base, and directly into the body of the vehicle. As a result, even though the body of the vehicle may be deformed by the impact, the tail light itself remains intact and the tail light continues to function. The same is true even after multiple impacts.

Accordingly, a tail light guard is now provided for off-road vehicles that at least partially surrounds and protects the tail light. The tail light guard also diverts the force of an impact around the tail light structure and into the vehicle body so that the tail light can continue to function. These and other features, aspects, and advantages of the tail light guard disclosed herein will become more apparent upon review of the detailed description set forth below taken in conjunction with the accompanying drawing figures, which are briefly described as follows.

DETAILED DESCRIPTION

Figure 1:
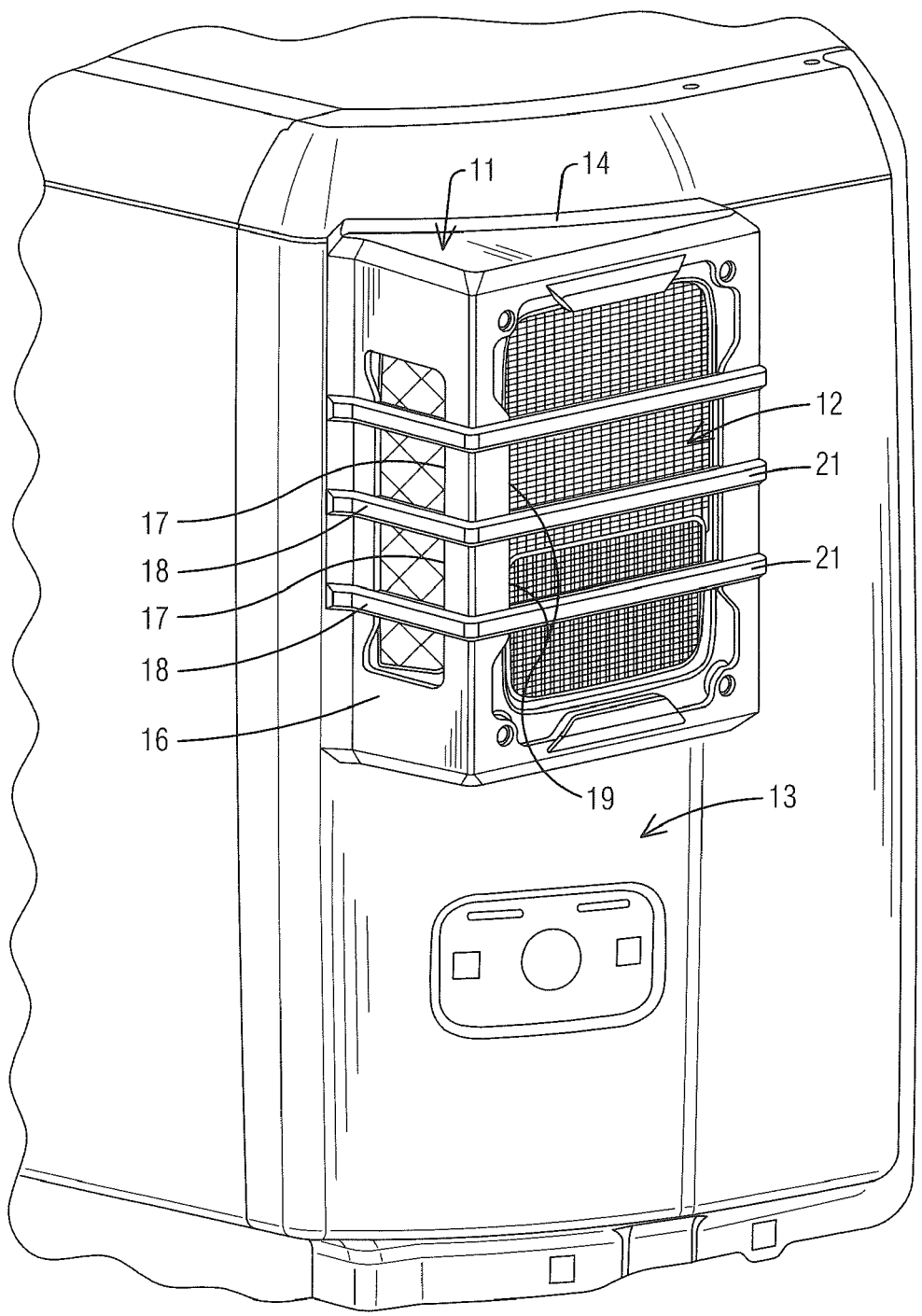
FIG. 1 is a perspective view of one embodiment of a force-diverting tail light guard mounted to the back of a Jeep® brand off-road vehicle surrounding and protecting a tail light.

Reference will now be made in more detail to the drawing figures, wherein like parts are indicated by like reference numerals throughout the several views.

FIG. 1 illustrates a force-diverting tail light guard 11 covering a tail light 12 on the rear left corner of a vehicle 13. The vehicle 13 may be a Jeep® brand vehicle, another brand of off-road vehicle, or any vehicle having tail lights that mount to and project from the surface of the vehicle. The tail light guard 11, which preferably is made of rigid metal, includes a base 14 and a cage 16 that is mounted to the base 14 and extends rearwardly therefrom. The cage 16 is sized and configured to cover the back lens and sides of the tail light 12. Openings are formed in the cage to allow light from the tail light to be visible and, in this embodiment, spaced bars 18 span the openings forming a protective cage. While spaced bars are illustrated in this embodiment, this is, of course, not a limitation of the invention. It will be understood that any configuration of openings and structures that protect the tail light while allowing its light to be visible might be selected with substantially equivalent results.

Figure 2:
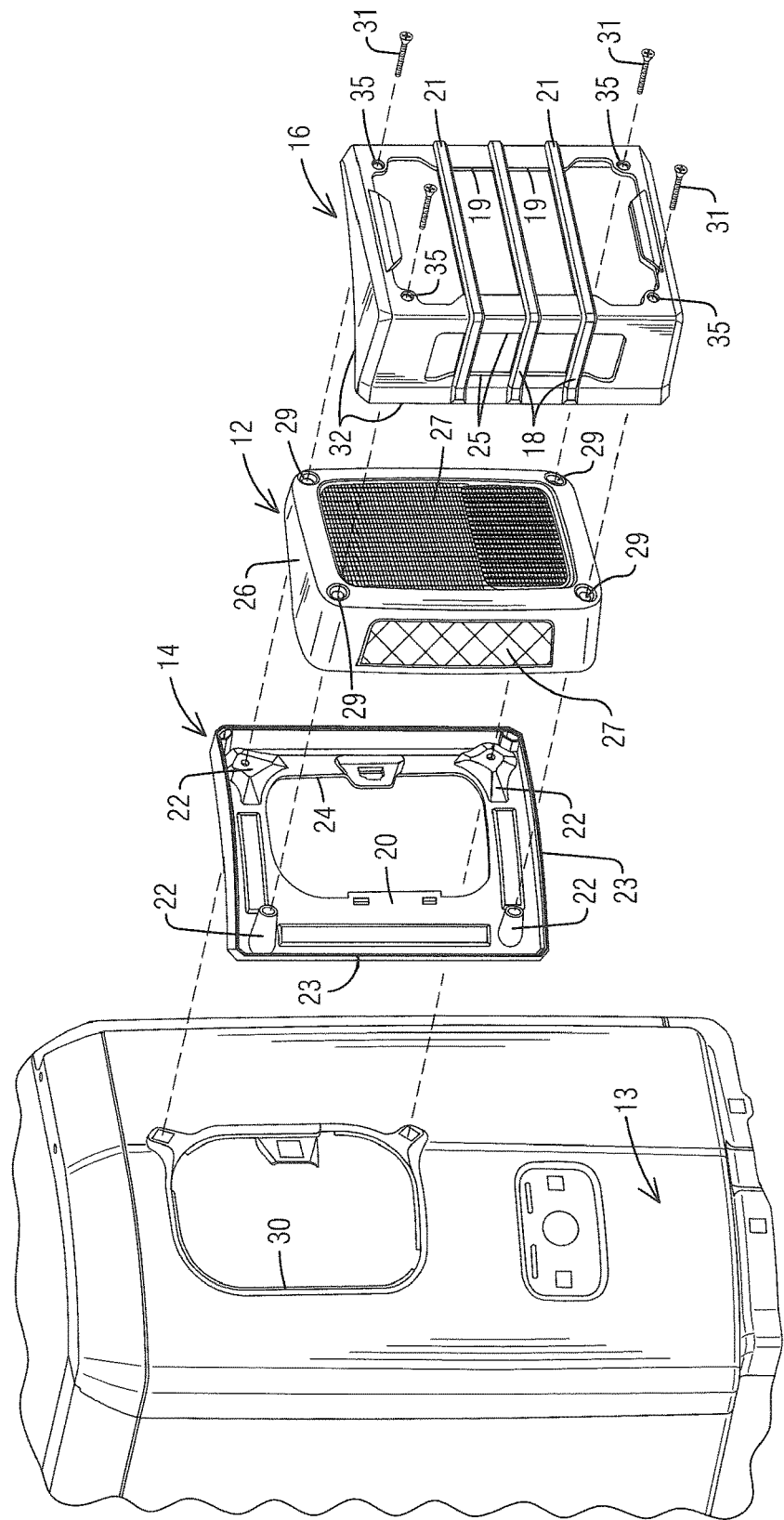
FIG. 2 is a perspective exploded view of the force-diverting tail light guard showing its clamshell mating components in relation to a tail light and the vehicle body.

FIG. 2 is an exploded perspective view of the force-diverting tail light guard showing better a preferred configuration of its components. The base 14 is configured with a base plate 20 having an opening 24 formed therein. The opening 24 may correspond in size and shape roughly to the size and shape of the opening 30 formed in the vehicle body. Both openings accommodate connectors and wiring (not shown) that attach the tail light 12 to the electrical system of the vehicle. A rim 23 projects from the base plate 20 around the peripheral edges of the base plate. In the illustrated embodiment, screw bosses 22 project rearwardly from the corner sections of the base plate. The screw bosses on the right in FIG. 2 have holes that align with the mounting holes 29 formed in the tail light 12. The screw bosses on the left in FIG. 2 are threaded or otherwise configured to receive mounting screws, as described in more detail below.

The tail light 12 in this embodiment comprises a casing 26 for containing light bulbs, LED lights, or other light sources. The back surface of the tail light is defined by one or more lenses 27 that allow light from the light source to be visible when, for instance, a driver depresses the brake pedal or turns on the vehicle's lights. A side marker lens 27 is disposed on the outside-facing side of the tail light 12 to allow the vehicle to be seen from the side. In the illustrated embodiment, four mounting screw holes 29 are formed at respective corners of the tail light 12. Normally, these receive screws used to mount the tail light to the body of the vehicle 13 and/or to fasten sections of the tail light together. These same screw holes 29 are used with the present invention not only to mount the tail light 12 to the vehicle, but also to secure the base 14 and cage 16 of the tail light guard 11 together surrounding the tail light 12 and to secure the tail light guard to the vehicle.

With continuing reference to FIG. 2, the cage 16 of the tail light guard is formed with bars 18 covering an opening 25 on the side-facing surface of the cage 16. Bars 21 cover an opening 19 in the rear-facing surface of the cage 16. The opening 25 allows light from the side marker lens 27 to be seen from the side of the vehicle 13. The opening 19 allows light from the tail light lens 27 to be seen from the rear of the vehicle. In the illustrated embodiment, four screws 31 are sized to extend through screw holes 35 in the corners of the cage 16 and through existing screw holes 29 in the tail light 12.

The pair of screws on the right in FIG. 2 also extend through the holes of the screw bosses 22 on the right in base 14. These screws are threaded into the body of the vehicle to secure the tail light and tail light guard in place. The screws on the left in FIG. 2 thread directly into the left pair of screw bosses 22 of the base 14. With this configuration, the base 14 mounts to the vehicle with clips on the left (not visible) that clip beneath the edge of the opening 30 on the left and screws and the two screws 31 on the right in FIG. 2, which are threaded into the vehicle body. This process also mates the base 14 and cage 16 securely together with the cage surrounding the tail light 12.

Figure 3:
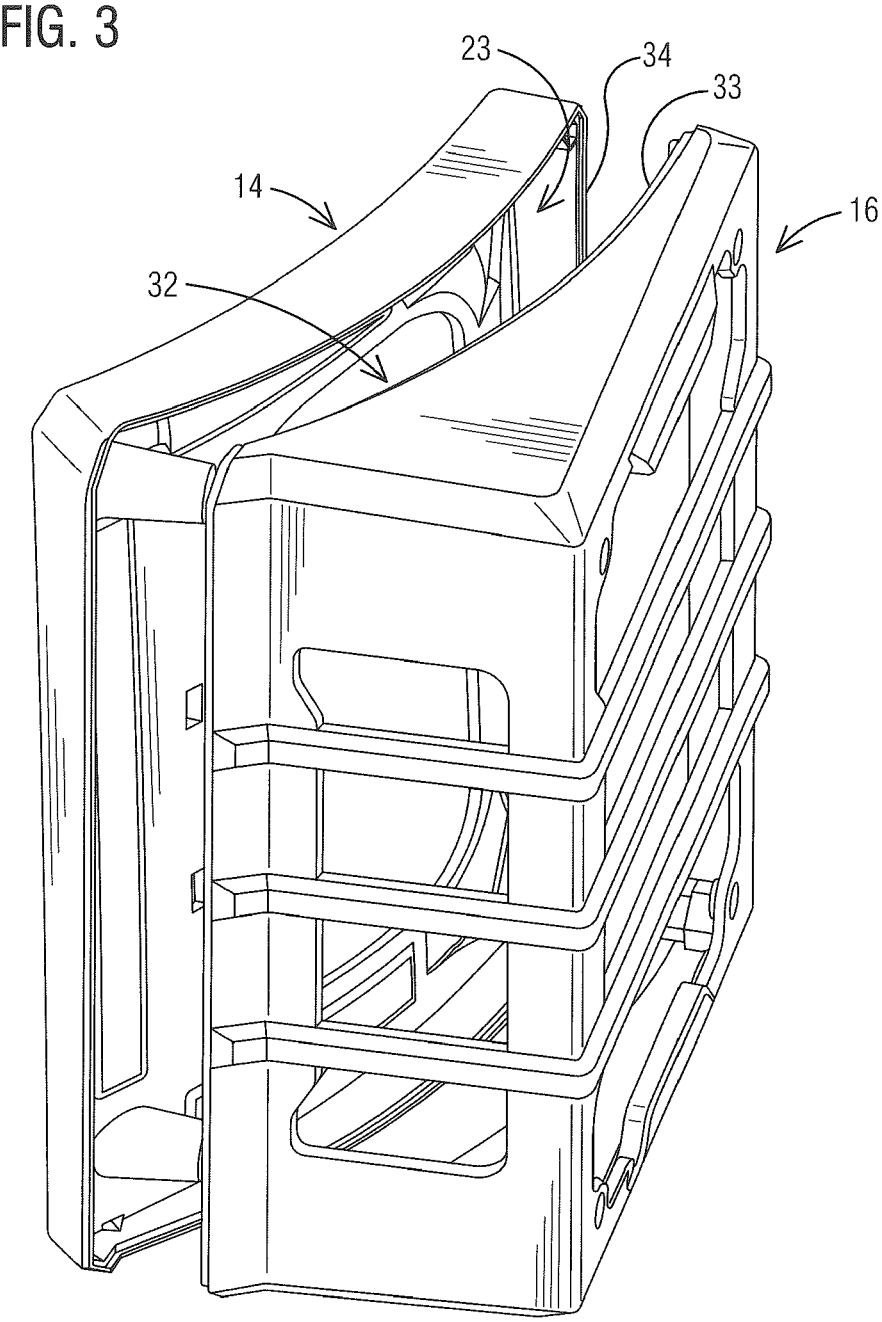
FIG. 3 is a perspective slightly exploded view of the force-diverting tail light guard illustrating better the clamshell mating relationship of the base and the cage.

FIG. 3 illustrates a preferred configuration of the base 14 and cage 16 facilitating the mating of these components together in "clamshell" fashion. The base 14 and cage 16 are shown slightly separated as they appear when being brought together around a tail light. The base 14 in this embodiment is formed with an internal groove 34 that extends around the exposed edges of the rim 23. The cage 16 is formed with an internal tongue 33 that extends around the exposed edges of the cage. When the cage 16 and the base 14 are brought together as illustrated by the broken lines, the internal tongue 33 of the cage is received into the internal groove 34 of the base. In this way, the cage and base become very securely joined together so that they essentially become a monolithic structure and the cage 16 cannot slide or move relative to the base 14.

Figure 4:
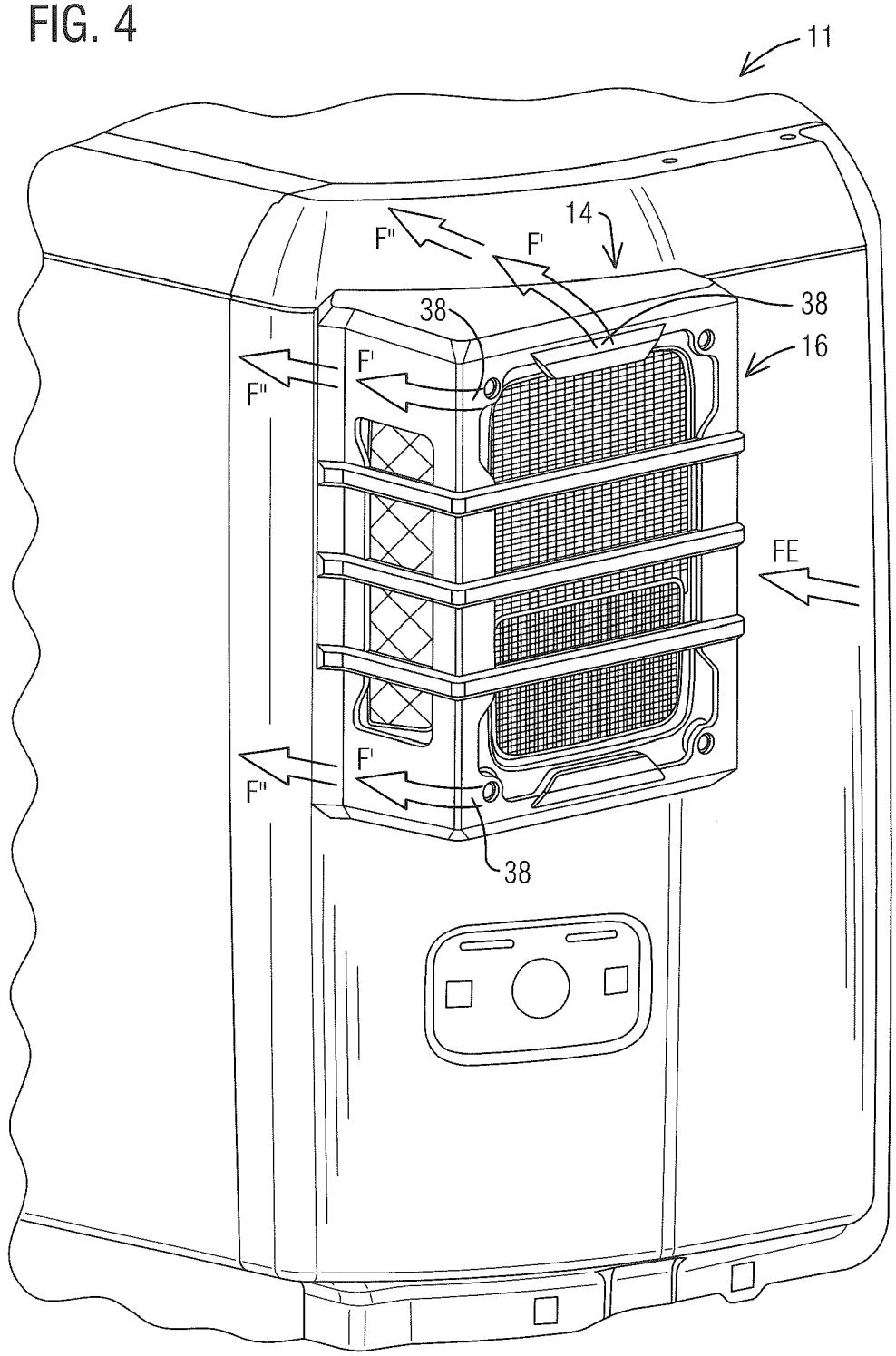
FIG. 4 is a perspective view of the force-diverting tail light showing the base and the cage completely mated as they are when surrounding a tail light.

FIG. 4 illustrates the unique way in which the force-diverting tail light guard of this invention protects the tail light in the event of an impact due to flying debris or a collision. More specifically, the tail light guard 11 may be subjected to an external force FE from an event such as a collision or flying debris. With prior art tail light guards, such a force is transferred directly to the structure of the tail light, often resulting in breakage of the tail light and/or rendering the tail light inoperative. In contrast, the tail light guard of this invention at least partially surrounds the tail light 12 at least on its exposed sides and the base rests directly on the body of the vehicle. In this way, the tail light is isolated from the tail light guard.

In the illustrated embodiment, the base plate 20 (FIG. 2) of the base 14 partially underlies the vehicle-facing side of the tail light 12 so that all sides of the tail light structure are at least partially covered. Furthermore, the base plate 20 rests directly on the vehicle body and is interposed between the vehicle-facing side of the tail light 12 and the body of the vehicle. Alternatively, the base might simply rest on the body of the vehicle around the tail light structure without having a base plate that extends beneath the tail light structure. While the former is preferred, the latter is considered equivalent.

With the tail light guard mounted to the vehicle surrounding the tail light as just described, the tail light becomes isolated from the guard and protected from damage by flying debris, impacts, or other forces from external events. More specifically, when an external force FE is imparted to the tail light guard 11, the force FE is spread out through the bars and structure of the guard. In this way, it is diverted from its location of origin outwardly to the sides of the cage 16 as illustrated at 38 in FIG. 4. The spread-out components F' of the initial external force FE then transfer through the sides of the cage 16 to the base 14 through the clam-shell joint between the cage 16 and the base 14. As a result of the tongue-and-groove mating of the base 14 and cage 16 at this joint, the force components F' are transferred efficiently to the base because the cage 16 is unable to slide or move with respect to the base and the two are essentially monolithic.

From the base 14, the spread-out components F' of the external force FE are transferred directly to the body of the vehicle 13 as indicated at F''' in FIG. 4. It can be seen, then, than no component of the external force FE is transferred to the tail light structure itself. Rather, the force components are diverted around the tail light and transferred directly into the vehicle. If flying debris or an impact is significant enough, the components F' of the initial force FE may be sufficient to cause the metal of the vehicle to be deformed beneath the tail light guard. However, by efficiently diverting external forces around the tail light and to the vehicle, the tail light itself is protected and unlikely to be broken or rendered inoperative by the impact. The light continues to function and can be seen by others, thereby enhancing the safety of the vehicle especially in remote off-road environments.

The invention has been described herein in terms of preferred embodiments and methodologies considered by the inventors to represent the best mode of carrying out the invention. However, a wide gamut of additions, deletions, and revisions to the illustrated embodiments may be made by skilled artisans within the scope of the invention. For example, the illustrated bars of the cage are considered effective, but any structure or structures that cover the openings of the cage and protect the tail light may be substituted with equivalent results. Such a structure might include, for example, a mesh or screen material or bars that form a pattern different from the bars of the exemplary embodiment described herein.

The tongue-and-groove configuration that ensures secure clamshell joining of the base and the cage has been found effective, but other structures may be used to align the cage and base and prevent them from moving with respect to each other. For instance, internal tabs, peripheral spikes or detents, serrations, and matching irregularities in the base and cage as well as other structures may perform the same function and obtain the same result as the disclosed tongue-and-groove clamshell mating arrangement.

The illustrated screw-mounting arrangement shown in the illustrated embodiment is particular to a vehicle in which tail lights are mounted from the outside with clips on one side and screws on the other. Tail lights can be mounted in many other ways such as, for example, from the inside of the vehicle body or exclusively with clips that snap together when the tail light is pressed into place. In such instances, the base and cage may be modified to accommodate a different mounting arrangement. For instance, if the tail lights of a particular vehicle mount from inside the vehicle body, then the base of the tail light guard might be modified to accept mounting fasteners from inside the body with the cage then being mounted directly to the base. Accordingly, the present invention is not limited to the mounting structures and mechanisms shown in the exemplary embodiments, but includes all adaptations for various taillight mounting arrangements from vehicle to vehicle. In some instances, it may be advantageous to mount the base directly to the body of the vehicle with adhesive, double-sided tape, or other mechanisms that do not include physical fasteners.

These and other additions, deletions, and modifications, both subtle and gross, might well be made to the example embodiments described herein without departing from the spirit and scope of the invention, which is delineated only by the claims.

What is claimed is:

1. A force-diverting tail light guard for a vehicle having tail lights that project away from the body of the vehicle, each tail light having a vehicle-facing surface and a back surface joined by sides, the force-diverting tail light guard comprising:
   a base configured to be mounted against the body of the vehicle with at least part of the base extending around the vehicle-facing surface of the tail light;
   a cage configured to be mated to the base, the cage at least partially covering at least the back surface of the tail light when mated to the base;
   the base and the cage, when mated together, at least partially surrounding the tail light; and
   fastening means for mounting the force-diverting tail light guard to the body of the vehicle;
   the tail light guard being configured to divert external forces around the tail light and to transfer the diverted forces directly to the body of the vehicle to prevent the external forces from breaking the tail light or rendering the tail light inoperable.

2. A force-diverting tail light guard as claimed in claim 1 wherein the base further comprises a base plate configured to extend at least partially between the vehicle facing surface of the tail light and the vehicle body, the base plate having a base plate opening for accommodating wiring to the tail light.

3. A force-diverting tail light guard as claimed in claim 1 wherein the cage comprises a back cage opening to allow light from the back surface of the tail light to be seen and a side cage opening to allow light from at least one side of the tail light to be seen.

4. A force-diverting tail light guard as claimed in claim 3 further comprising first structures spanning the back cage opening and second structures spanning the side cage opening, the first and second structures being configured to deflect flying debris that might otherwise damage the tail light.

5. A force-diverting tail light guard as claimed in claim 4 wherein the first structures comprise bars and the second structures comprise bars.

6. A force-diverting tail light guard as claimed in claim 1 wherein the cage at least partially surrounds the sides of the tail light.

7. A force-diverting tail light guard as claimed in claim 1 further comprising a third structure on the base plate and a fourth structure on the cage, the third and fourth structures engaging to resist relative movement between the cage and the base when the cage and the base are mated together.

8. A force-diverting tail light guard as claimed in claim 7 wherein the third structure comprises a tongue on one of the base and the cage and the fourth structure comprises a tongue-receiving groove on the other one of the base and the cage.

9. A force-diverting tail light guard as claimed in claim 1 wherein the fastening means comprises screws.

10. A force-diverting tail light guard as claimed in claim 9 wherein at least some of the screws extend through the cage, through the tail light, through the base, and into the body of the vehicle.

\* \* \* \* \*